United States Patent
Zhao (10) Patent No.: US 11,925,889 B1
(45) Date of Patent: Mar. 12, 2024

(54) SPLICEABLE AND FOLDABLE FILTER ELEMENT DEVICE

(71) Applicant: Jianping Zhao, Suzhou (CN)

(72) Inventor: Jianping Zhao, Suzhou (CN)

( * ) Notice: Subject to any disclaimer, the term of this patent is extended or adjusted under 35 U.S.C. 154(b) by 0 days.

(21) Appl. No.: 18/244,558

(22) Filed: Sep. 11, 2023

(30) Foreign Application Priority Data

Aug. 15, 2023 (CN) .......................... 202322186640.3

(51) Int. Cl.
*B01D 46/02* (2006.01)
*B01D 46/52* (2006.01)

(52) U.S. Cl.
CPC .......... *B01D 46/02* (2013.01); *B01D 46/521* (2013.01); *B01D 2201/30* (2013.01)

(58) Field of Classification Search
CPC ... B01D 46/02; B01D 46/521; B01D 2201/30
USPC ........................................................ 210/348
See application file for complete search history.

(56) References Cited

U.S. PATENT DOCUMENTS

| | | | | |
|---|---|---|---|---|
| 4,135,900 A | * | 1/1979 | Westlin | B01D 46/10 55/499 |
| 4,195,681 A | * | 4/1980 | Douglas | E06B 9/52 160/381 |
| 5,558,689 A | * | 9/1996 | Yanagihara | B01D 46/0001 55/501 |
| 6,464,745 B2 | * | 10/2002 | Rivera | B01D 46/523 55/497 |
| 2015/0328566 A1 | * | 11/2015 | Oosthuizen | B01D 21/0069 210/322 |

FOREIGN PATENT DOCUMENTS

CN 218608465 U * 3/2023 ............. B01D 46/00

OTHER PUBLICATIONS

Translation of Wu (CN218608465U) (Year: 2023).*

* cited by examiner

*Primary Examiner* — Ekandra S. Miller-Cruz
(74) *Attorney, Agent, or Firm* — WPAT, P.C (57) ABSTRACT

A spliceable and foldable filter element device is provided, which includes a quadrilateral filter element body made of a flexible material. The quadrilateral filter element body is a folding layer having vertical folds. A left frame body and a right frame body are respectively disposed on a left side and a right side of the quadrilateral filter element body, at least one clamping rod is arranged between the left frame body and the right frame body, the clamping rod comprises three or more clamping teeth, the clamping teeth correspond to the folding layer in position, and the clamping rod is clamped with the folding layer through the clamping teeth. The spliceable and foldable filter element device has the advantages of simple structure, low cost, foldability, flexible use, convenience, easy storage and transportation.

12 Claims, 8 Drawing Sheets

SPLICEABLE AND FOLDABLE FILTER ELEMENT DEVICE

TECHNICAL FIELD

The disclosure relates to the technology field of filter elements, in particular to a spliceable and foldable filter element device.

BACKGROUND

In recent years, with the development of industrialization, the rising number of automobiles, and the low quality of fuel, the air quality has declined and the environment has been seriously polluted. Even though ventilation brings fresh air, it brings a lot of outdoor haze into rooms, which will harm people's respiratory systems and affect their health. Therefore, a variety of novel multi-functional composite air purification devices are developed to purify dust, haze, formaldehyde, and other harmful substances in the air.

Most existing indoor air purification devices adopt large air purifiers, which not only have large volumes, occupy indoor space, but also are difficult to maintain after being damaged, and have high maintenance costs. An existing filter element structure installed at an air conditioning vent is suitable for air conditioners with various structures such as a wall-mounted air conditioner, a vertical cabinet type air conditioner, a ceiling type air conditioner and other conditioners, and has advantages of small occupied space, convenient installation and disassembly. However, a length of the filter element structure suitable for the air conditioning vent is too long, which is not easy to store and transport.

Filter elements of some existing household air purification devices also have the problems of inconvenient replacement, difficult storage, and inconvenient transportation.

SUMMARY

A purpose of the disclosure is to provide a spliceable and foldable filter element device that has the advantages of simple structure, low cost, foldability, flexible use, convenience, easy storage, and convenient transportation.

In order to achieve the purpose, the disclosure provides a spliceable and foldable filter element device. The device includes a quadrilateral filter element body made of a flexible material. The quadrilateral filter element body is a continuous folding layer having vertical folds. A left frame body and a right frame body are respectively disposed on a left side and a right side of the quadrilateral filter element body. At least one clamping rod is arranged between the left frame body and the right frame body, the clamping rod includes at least three clamping teeth, the at least three clamping teeth are disposed to correspond to the folding layer in position, and the clamping rod is clamped with the folding layer through the at least three the clamping teeth.

In an embodiment, the flexible material is polyester fiber.

In an embodiment, the folding layer includes at least three foldable grooves including a first vertical groove, a second vertical groove, and a third vertical groove, each of which is foldable. The first vertical groove and the third vertical groove are respectively disposed at two ends of the second vertical groove; the at least three clamping teeth at least include a first clamping tooth, a second clamping tooth, and a third clamping tooth. The first clamping tooth, the second clamping tooth, and the third clamping tooth are disposed to respectively correspond to the first vertical groove, the second vertical groove, and the third vertical groove in position. The first clamping tooth, the second clamping tooth, and the third clamping teeth are respectively clamped on the first vertical groove, the second vertical groove, and the third vertical groove.

In an embodiment, the clamping rod further includes a transverse rod, and the transverse rod is disposed between the left frame body and the right frame body. The clamping rod is disposed on the transverse rod.

In an embodiment, upper and lower ends of the quadrilateral filter element body are respectively provided with an upper frame body and a lower frame body.

In an embodiment, the spliceable and foldable filter element device further includes corner connectors: a first corner connector, a second corner connector, a third corner connector, and a fourth corner connector. The first corner connector is disposed between the upper frame body and the left frame body, the second corner connector is disposed between the left frame body and the lower frame body, the third corner connector is disposed between the upper frame body and the right frame body, and the fourth corner connector is disposed between the right frame body and the lower frame body.

In an embodiment, each of the corner connectors includes a transverse plate and a vertical plate. An end of the transverse plate is connected to an end of the vertical plate. A first end plate and A second end plate are disposed on two sides of the transverse plate respectively, the first end plate and the second end plate are disposed on two sides of the vertical plate respectively, and a groove is defined between the first end plate and the second end plate, and each of the corner connectors is clamped on a corresponding corner of the quadrilateral filter element body through the groove.

In an embodiment, each of the upper frame body, the lower frame body, the left frame body and the right frame body is a structure having an elongated groove, and each of the upper frame body, the lower frame body, the left frame body and the right frame body is clamped on two corresponding corner connectors of the corner connectors through the elongated groove.

In an embodiment, the structure having the elongated groove comprises two baffle sheets respectively disposed at two opposite sides of the structure having the elongated groove, an elongated plate is disposed between the two baffle sheets, and a slot is defined between the elongated groove and one of the two baffle sheets.

The disclosure has the following beneficial technical effects: the spliceable and foldable filter element device of the disclosure includes a quadrilateral filter element body made of a flexible material, and the quadrilateral filter element body is a folding layer having vertical folds; a left frame body and a right frame body are respectively disposed on a left side and a right side of the quadrilateral filter element body; at least one clamping rod is arranged between the left frame body and the right frame body; the clamping rod is configured to fix the quadrilateral filter element body; the spliceable and foldable filter element device has the advantages of simple structure, low cost, convenient installation and replacement, and more flexible and convenient usage; the quadrilateral filter element body can be folded, reduces the occupied area, facilitates storage and transportation, has high practicality and strong adaptability, and is suitable for general use.

BRIEF DESCRIPTION OF DRAWINGS

In order to more clearly illustrate embodiments of the disclosure or technical solutions in the prior art, the following will briefly introduce the drawings used in the description of the embodiments or the prior art. Apparently, the drawings in the following description are only some embodiments of the disclosure. For those of ordinary skill in the art, other drawings may also be derived from structures shown in these drawings.

The realization of the purpose, functional features, and advantages of the disclosure will be further described in conjunction with the embodiments and with reference to the drawings.

DETAILED DESCRIPTION OF EMBODIMENTS

The technical solutions in the embodiments of the disclosure will be clearly and completely described below in conjunction with the drawings in the embodiments of the disclosure. Apparently, the described embodiments are only a part of the embodiments, but not all of them. Based on the described embodiments of the disclosure, all other embodiments obtained by those of ordinary skill in the art without creative work are within the scope of the disclosure.

It should be noted that all directional indications (such as up, down, left, right, front, back) in the embodiment of the disclosure are only used to explain relative positions and movement situations of components in a specific posture (as shown in the drawings). If the specific posture changes, the directional indications will change accordingly.

In the disclosure, the terms "connect", "fix" and the like should be interpreted in a broad sense, for example, the term "fixed" may be a fixed connection, a detachable connection, an integral connection, a mechanical connection, or an electrical connection. It can be a direct connection or an indirect connection through an intermediate medium, and it can be an internal communication of two elements or an interaction relationship of two elements. Those of ordinary skill in the art can understand the specific meaning of the above terms in the disclosure according to specific situations.

In addition, if there are descriptions of "first", "second", and the like in the embodiments of the disclosure, the descriptions of "first", "second", and the like are only used for a descriptive purpose and cannot be understood as indicating or implying their relative importance or implying the number of indicated technical features. Thus, the features defined with "first" and "second" may explicitly or implicitly include at least one of the features. In addition, the meaning of "and/or" in the disclosure includes three parallel solutions; for example "A and/or B" includes a solution A, a solution B, or a solution in which A and B are satisfied simultaneously. In addition, the technical solutions of each embodiment may be combined with each other, but must be based on a fact that a person of ordinary skill in the art can realize. When the combination of the technical solutions is contradictory or cannot be realized, it should be considered that such combination of the technical solutions does not exist and is not within the protection scope of the disclosure.

The disclosure provides a spliceable and foldable filter element device.

Figure 1:
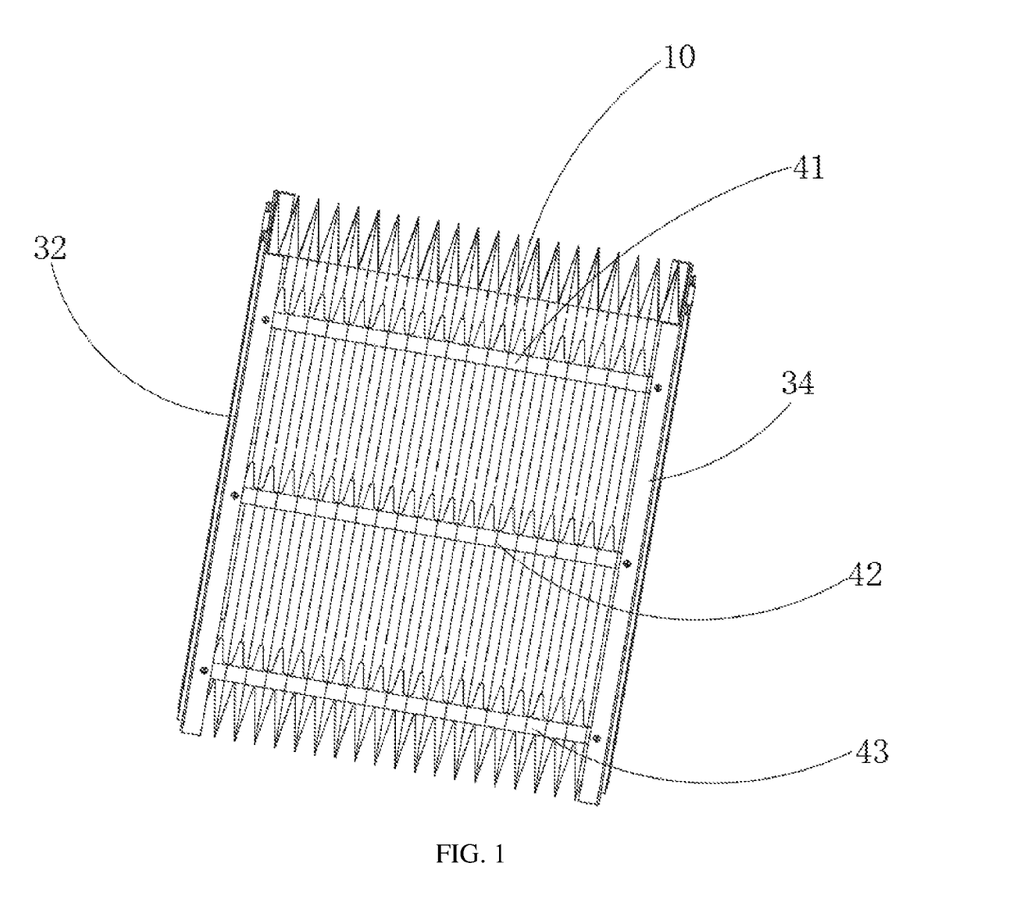
FIG. 1 illustrates a schematic structural diagram of a spliceable and foldable filter element device in an embodiment of the disclosure.
Figure 2:
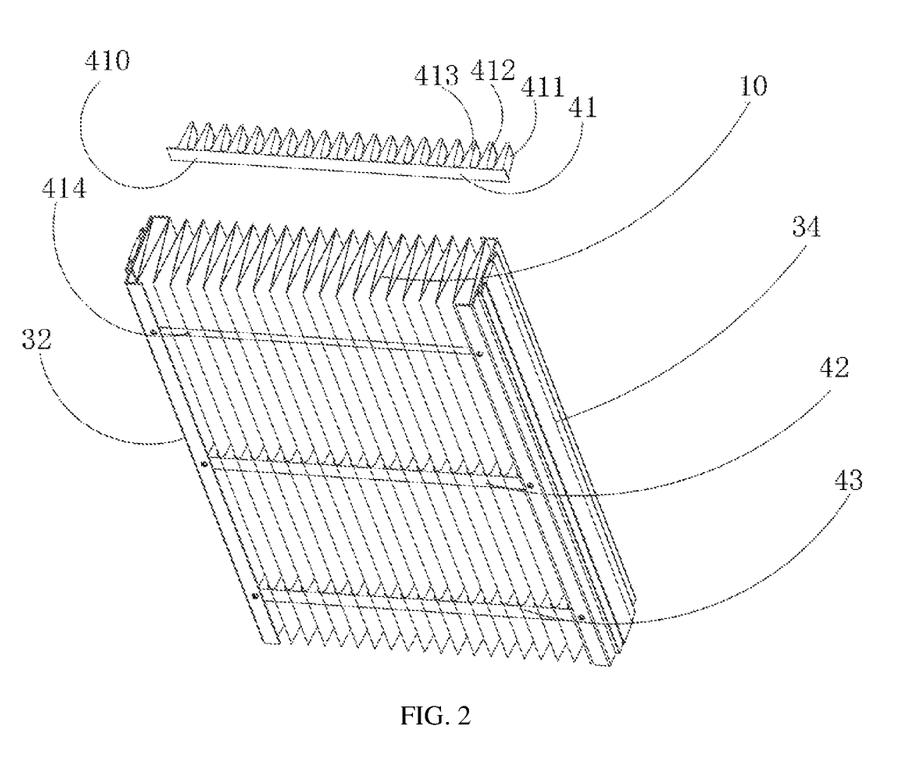
FIG. 2 illustrates a schematic disassembled diagram of the spliceable and foldable filter element device in FIG. 1.

Referring to FIG. 1 and FIG. 2, in the embodiment of the disclosure, the spliceable and foldable filter element device includes a quadrilateral filter element body 10 made of a flexible material. The quadrilateral filter element body 10 is a folding layer having vertical folds. A left frame body 32 and a right frame body 34 are respectively disposed on a left side and a right side of the quadrilateral filter element body 10. At least one clamping rod 41 is arranged between the left frame body 32 and the right frame body 34. Furthermore, in an embodiment, there are three clamping rods composed of a first clamping rod 41, a second clamping rod 42, and a third clamping rod 43 arranged between the left frame body 32 and the right frame body 34. Furthermore, the shape, structure, and size of the three clamping rods are consistent. The left frame body 32 and right frame body 34 are used to support the filter element body 10. The clamping rod is used to fix the filter element body 10, making the filter element body 10 more stable and reliable to use.

Referring to FIG. 2, the first clamping rod 41 includes three or more clamping teeth. Preferably, the first clamping rod 41 includes a first clamping plate 410. A first clamping tooth 411, a second clamping tooth 412, and a third clamping rod 413 are arranged on the first clamping plate 410. Multiple clamping teeth can also be set as needed, and the multiple clamping teeth can be continuously arranged on the first clamping plate 410, the clamping teeth are disposed to correspond to the position of the folding layer, and the clamping rod is clamped with the folding layer through the clamping teeth.

In the embodiment, the filter element body 10 has a certain width. The left frame body 32 and the right frame body 34 are respectively clamped on the left and right sides of the filter element body 10 to support the filter element body 10. The first clamping rod 41, the second clamping rod 42, and the third clamping rod 43 are respectively arranged between the left frame body 32 and the right frame body 34 to fix the filter element body 10, making the filter element body 10 more stable and reliable to use.

In the embodiment, preferably, the quadrilateral filter element body 10 made of a flexible material is the quadrilateral filter element body 10 made of polyester fiber; in other words, the filter element body 10 is the quadrilateral filter element body 10 made of the polyester fiber material.

Figure 5:
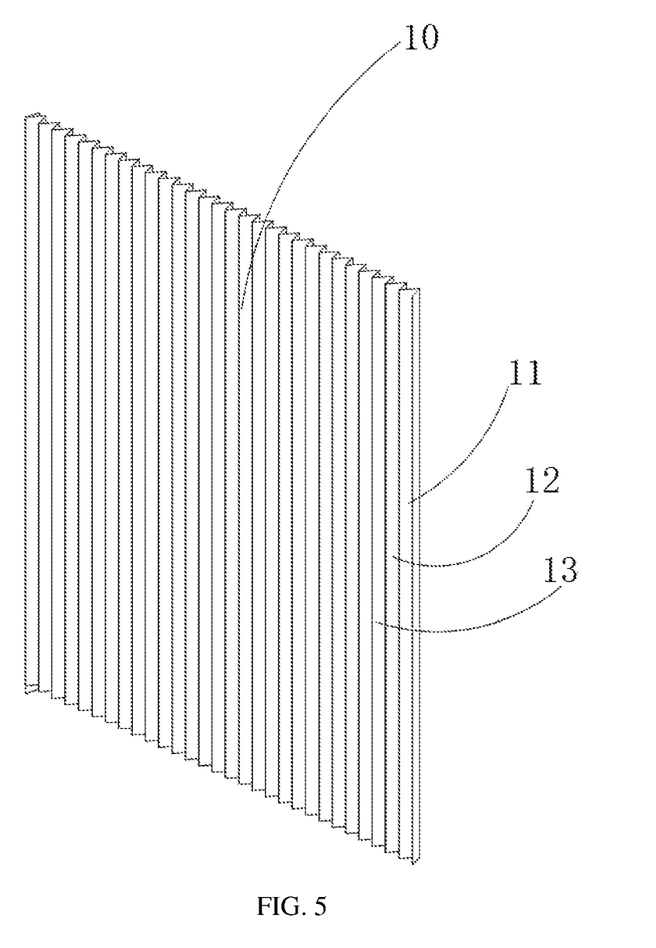
FIG. 5 illustrates a schematic structural diagram of a quadrilateral filter element body of the spliceable and foldable filter element device of the disclosure.

Referring to FIG. 2 and FIG. 5, in the embodiment, preferably, the continuous folding layer includes at least three vertical grooves (in other words, three structures having the vertical groove): the first vertical groove 11, the second vertical groove 12, and the third vertical groove 13 that can be folded. Of course, multiple vertical grooves can be continuously arranged on the folding layer according to actual needs.

The first vertical groove 11 and the third vertical groove 13 are respectively arranged at both sides of the second vertical groove 12. The first vertical groove 11, the second vertical groove 12, and the third vertical groove 13 form the continuous folding layer. The clamp teeth at least include a first clamping tooth 411, a second clamping tooth 412, and a third clamping tooth 413. The positions of the first clamping tooth 411, the second clamping tooth 412, and the third clamping tooth 413 correspond to the positions of the first vertical groove 11, the second vertical groove 12, and the third vertical groove 13, respectively. The first clamping tooth 411, the second clamping tooth 412, and the third clamping tooth 413 are respectively clamped with the first vertical groove 11, the second vertical groove 12, and the third vertical groove 13.

In the embodiment, the clamping plate 410 is provided with a first clamping tooth 411, a second clamping tooth 412, and a third clamping tooth 413. The first vertical groove 11, the second vertical groove 12, and the third vertical groove 13 form a continuous folding layer, and a first folding layer is formed between the first vertical groove 11 and the second vertical groove 12. The first clamping tooth 411 and the second clamping tooth 412 are clamped together with the first folding layer. A second folding layer is formed between the second vertical groove 12 and the third vertical groove 13, and the second clamping teeth 412 and the third clamping teeth 413 are clamped together with the second folding layer. In this reciprocating manner, the clamping teeth are continuously clamped together with the folding layer.

Referring to FIG. 2, in the embodiment, preferably, the first clamping rod 41 includes a first transverse rod 414. The first transverse rod 414 is disposed between the left frame body 32 and the right frame body 34.

In the embodiment, the first transverse rod 414 is disposed between the left frame body 32 and the right frame body 34 make the filter element body 10 more stable. The first clamping rod 41 disposed on the filter element body 10 is more stable and safer to use through the first transverse rod 414.

Figure 3:
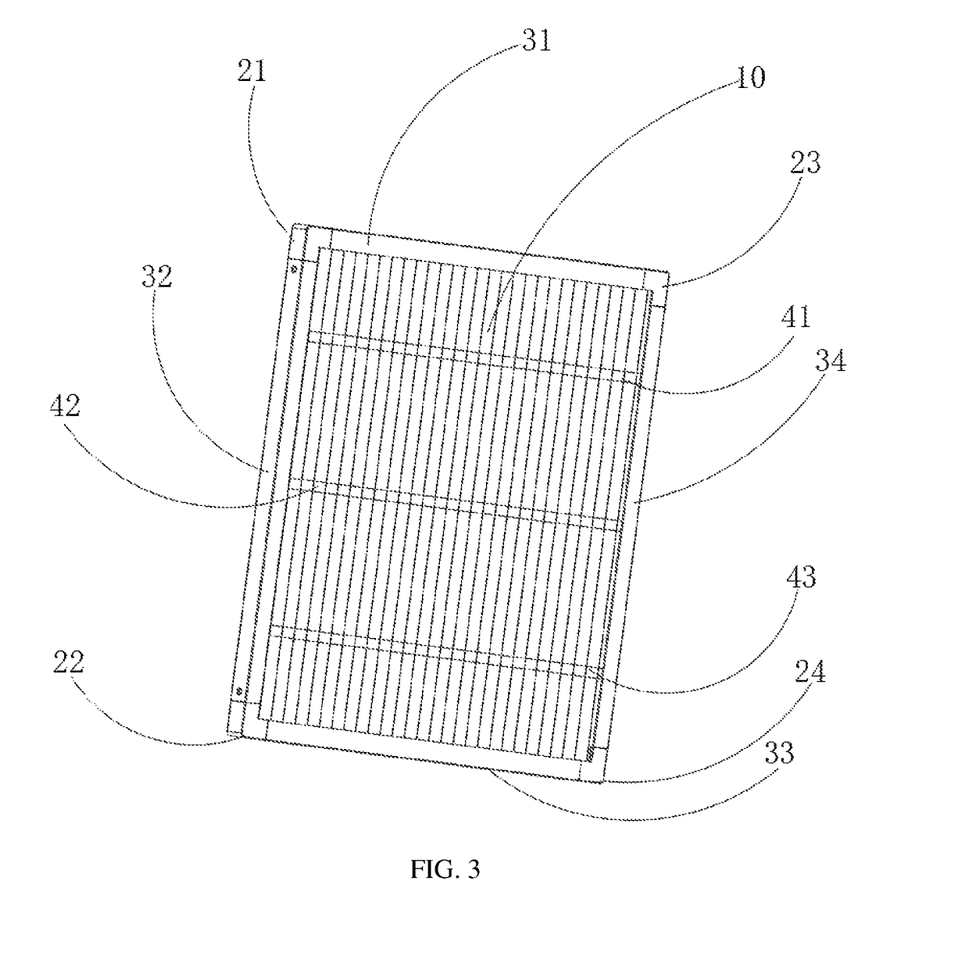
FIG. 3 illustrates a schematic structural diagram of the spliceable and foldable filter element device in another embodiment of the disclosure.
Figure 4:
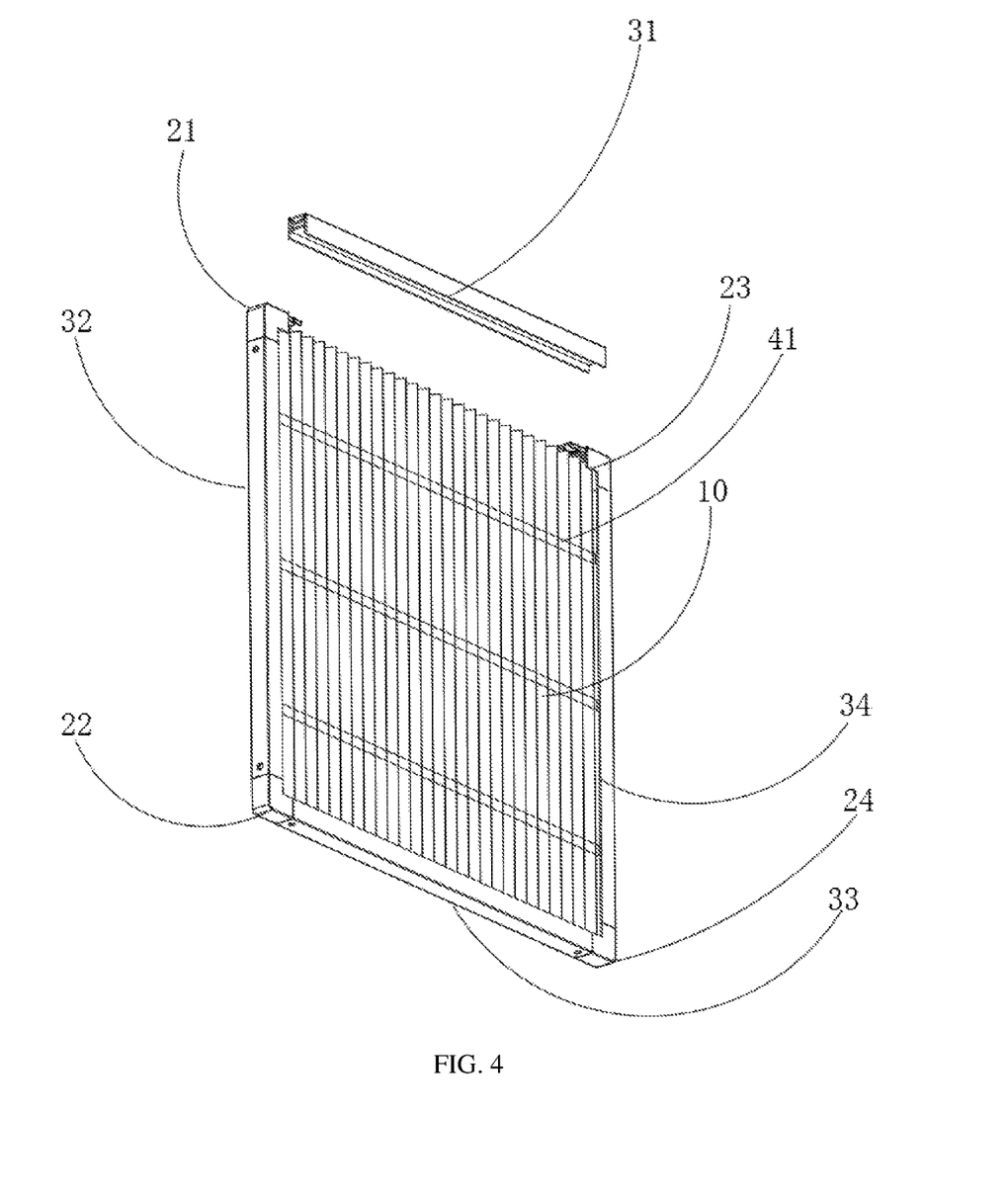
FIG. 4 illustrates a schematic disassembled diagram of the spliceable and foldable filter element device in FIG. 3.

Referring to FIG. 3 and FIG. 4, in the embodiment, preferably, upper and lower ends of the filter element body 10 are respectively provided with an upper frame body 31 and a lower frame body 33. Furthermore, in an embodiment, the upper frame 31, lower frame 33, left frame 32, and right frame 34 are consistent in shape, size and structure.

In the embodiment, in order to make the use of the filter element body 10 more stable and reliable, the left frame body 32 and the right frame body 34 respectively are respectively arranged on the left and right sides of the filter element body 10, the upper frame body 31 and the lower frame body 33 are respectively arranged on the upper and lower ends of the filter element body 10, making the use of the filter element body 10 safer and more reliable.

In order to facilitate the replacement, installation, and disassembly of the filter element device, in the embodiment, preferably, a first corner connector 21 is disposed between the upper frame body 31 and the left frame body 32. A second corner connector 22 is disposed between the left frame body 32 and the lower frame body 33. A third corner connector 23 is disposed between the upper frame body 31 and the right frame body 34. A fourth corner connector 24 is disposed between the right frame body 34 and the lower frame body 33.

In the embodiment, the first corner connector 21, the second corner connector 22, the third corner connector 23, and the fourth corner connector 24 are consistent in shape, size, and structure.

Two ends of the upper frame body 31 are respectively clamped with the first corner connector 21 and the third corner connector 23. Two ends of the lower frame body 33 are respectively clamped with the second corner connector 22 and the fourth corner connector 24. Two ends of the left frame body 32 are respectively clamped with the first corner connector 21 and the second corner connector 22. Two ends of the right frame body 34 are respectively clamped with the three corner connector 23 and the fourth corner connector 24.

Figure 6:
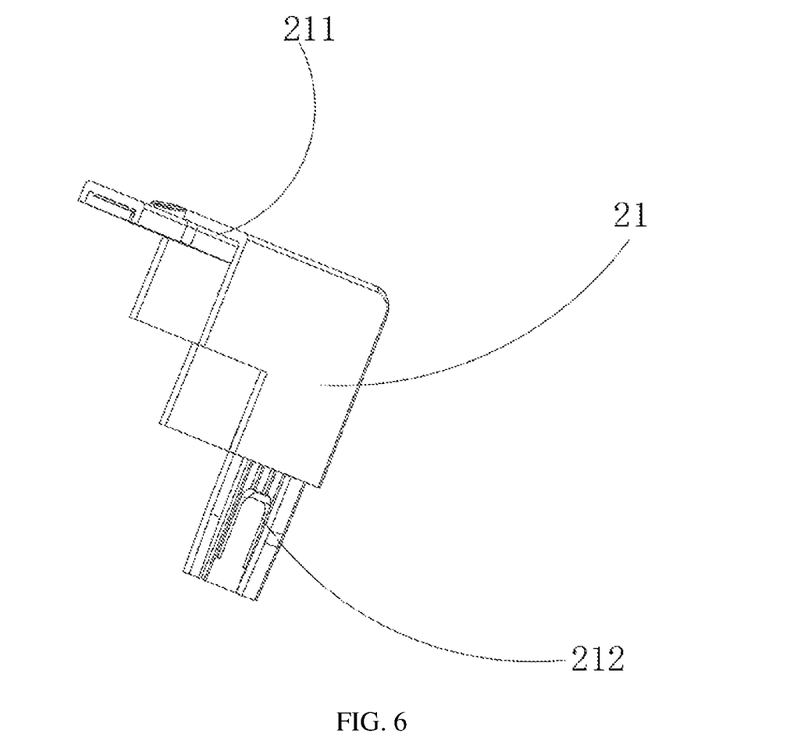
FIG. 6 illustrates a schematic structural diagram of a corner connector of the splicing foldable filter element device in the embodiment of the disclosure.
Figure 7:
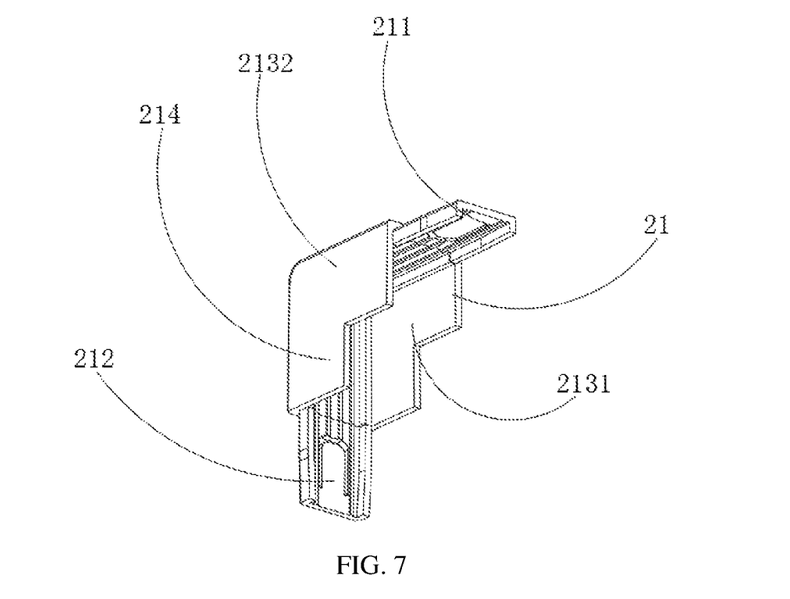
FIG. 7 illustrates a schematic structural diagram of another corner connector of the splicing foldable filter element device in the embodiment of the disclosure.

Referring to FIG. 6 and FIG. 7, in the embodiment, preferably, the first corner connector 21 includes a first transverse plate 211 and a first vertical plate 212. An end of the first transverse plate 211 is connected to an end of the first vertical plate 212. Preferably, the end of the first transverse plate 211 is connected to the end of the first vertical plate 212 at a right angle.

A first end plate 2131 and a second end plate 2132 are disposed on two sides of the first transverse plate 211 respectively. The first end plate 2131 and the second end plate 2132 are also disposed on two sides of the second transverse plate 212 respectively. A first groove 214 is defined between the first end plate 2131 and the second end plate 2132, and the first corner connector 21 is clamped on an end corner of the filter element body 10 through the first groove 214; that is to say, the first corner connector 21 is clamped on an upper-left corner of the filter element body 10 through the first groove 214. Similarly, the second corner connector 22 is clamped on a lower-left corner of the filter element body 10; the third corner connector 23 is clamped on an upper-right corner of the filter element body 10; the fourth corner connector 24 is clamped on a lower-right corner of the filter element body 10. Each of the four frame bodies are respectively clamped on two corresponding corner connectors of the four corner connectors.

Figure 8:
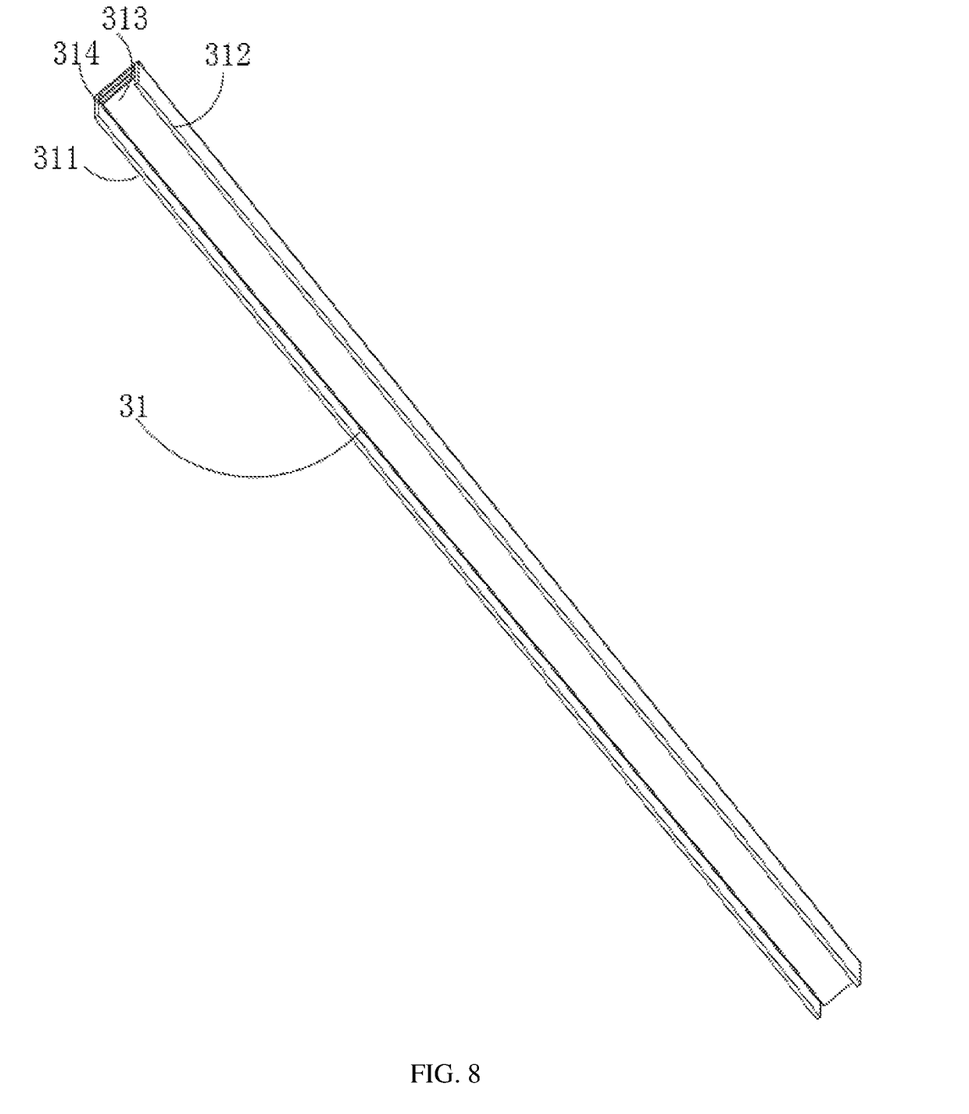
FIG. 8 illustrates a schematic structural diagram of a frame body of the splicing foldable filter element device in the embodiment of the disclosure.

Referring to FIG. 8, in the embodiment, preferably, the upper frame body 31 defines an elongated groove. Two ends of the upper frame body 31 are respectively clamped on the first corner connector 21 and the third corner connector 23 through the elongated groove.

Figure 9:
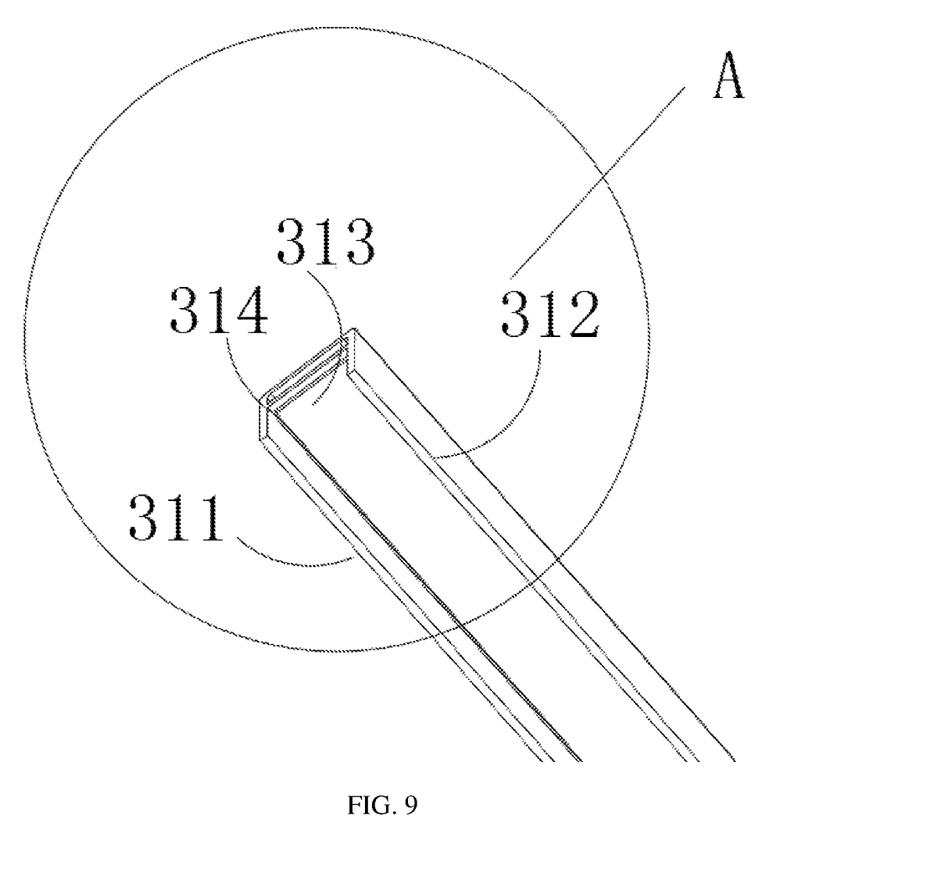
FIG. 9 illustrates an enlarged view of the portion A of FIG. 8.

In the embodiment, preferably, the upper frame body 31 includes a first baffle sheet 311 and a second baffle sheet 312. The first baffle sheet 311 and the second baffle sheet 312 are disposed left and right sides of the upper frame body 31. An elongated plate is 313 disposed between the first baffle sheet 311 and the second baffle sheet 312. A width of the elongated plate 313 is less than a width between the first baffle sheet 311 and the second baffle sheet 312. A slot 314 is defined between the elongated plate 313 and the first baffle sheet 311.

The upper frame body 31 can be clamped on a top of the filter element body 10 through the slot 314, making the filter element body 10 more stable and safer; similarly, the lower frame body 33, the left frame body 32, and the right frame body 34 can be connected to the filter element body 10 by using the same method.

In the embodiment, preferably, the elongated plate 313 includes two long sheets (not shown in figures). The two long sheets are tightly attached to the first baffle sheet 311 and the second baffle sheet 312 respectively. The slot 314 is defined between the two long sheets and the elongated groove, which facilitates inserting the filter element body 10 into the upper frame body 31 and making the upper frame body 31 be clamped on the filter element body 10.

The filter element body 10 of the disclosure forms multiple folding layers due to continuous folding. According to actual needs, the number of the filter element body 10 can be multiple, and the multiple filter element bodies 10 can be spliced together. The spliceable and foldable filter element device is not only more flexible in use, but also more convenient in installation, disassembly, and replacement.

What is claimed is:

1. A spliceable and foldable filter element device, comprising a quadrilateral filter element body made of a flexible material; wherein the quadrilateral filter element body is a folding layer having vertical folds, a left frame body and a right frame body are respectively disposed on a left side and a right side of the quadrilateral filter element body, at least one clamping rod is arranged between the left frame body and the right frame body, each of the at least one clamping rod comprises at least three clamping teeth, the at least three clamping teeth are disposed to correspond to the folding layer in position, and each of the at least one clamping rod is clamped with the folding layer through the at least three clamping teeth;

wherein each of the left frame body and the right frame body comprises: an elongated plate and two baffle sheets respectively disposed at two opposite sides of the elongated plate: the elongated plate and the two baffle sheets together define an elongated groove, and a width of the elongated plate in a direction from one of the two baffle sheets to the other of the two baffle sheets is less than a spacing between the two baffle sheets: a slot is defined between one of the two baffle sheets and a side of the elongated plate facing towards the one of the two baffle sheets: a corresponding one of the left frame body and the right frame body is clamped on the quadrilateral filter element body through the slot; and the quadrilateral filter element body is partially accommodated in the elongated groove.

2. The spliceable and foldable filter element device as claimed in claim 1, wherein the flexible material is polyester fiber.

3. The spliceable and foldable filter element device as claimed in claim 2, wherein the folding layer comprises at least three foldable grooves comprising a first vertical groove, a second vertical groove, and a third vertical groove, each of which is foldable; the first vertical groove and the third vertical groove are respectively disposed at two ends of the second vertical groove; the at least three clamping teeth at least comprise a first clamping tooth, a second clamping tooth, and a third clamping tooth; the first clamping tooth, the second clamping tooth, and the third clamping tooth are disposed to respectively correspond to the first vertical groove, the second vertical groove and the third vertical groove in position; and the first clamping tooth, the second clamping tooth, and the third clamping teeth are respectively clamped on the first vertical groove, the second vertical groove, and the third vertical groove.

4. The spliceable and foldable filter element device as claimed in claim 3, further comprising a transverse rod, the transverse rod is disposed between the left frame body and the right frame body, and one of the at least one clamping rod is disposed on the transverse rod.

5. The spliceable and foldable filter element device as claimed in claim 4, wherein upper and lower ends of the quadrilateral filter element body are respectively provided with an upper frame body and a lower frame body.

6. The spliceable and foldable filter element device as claimed in claim 5, wherein the spliceable and foldable filter element device further comprises corner connectors: a first corner connector, a second corner connector, a third corner connector, and a fourth corner connector; the first corner connector is disposed between the upper frame body and the left frame body, the second corner connector is disposed between the left frame body and the lower frame body, the third corner connector is disposed between the upper frame body and the right frame body, and the fourth corner connector is disposed between the right frame body and the lower frame body.

7. The spliceable and foldable filter element device as claimed in claim 6, wherein each of the corner connectors comprises a transverse plate and a vertical plate; an end of the transverse plate is connected to an end of the vertical plate, a first end plate and a second end plate are disposed on two sides of the transverse plate respectively, the first end plate and the second end plate are disposed on two sides of the vertical plate respectively, a groove is defined between the first end plate and the second end plate, and each of the corner connectors is clamped on a corresponding corner of the quadrilateral filter element body through the groove.

8. The spliceable and foldable filter element device as claimed in claim 7, wherein each of the upper frame body and the lower frame body comprises: an elongated plate and two baffle sheets respectively disposed at two opposite sides of the elongated plate: the elongated plate and the two baffle sheets of each of the upper frame body and the lower frame body together define an elongated groove, and each of the upper frame body, the lower frame body, the left frame body and the right frame body is clamped on two corresponding corner connectors of the corner connectors through a corresponding one elongated groove.

9. A spliceable and foldable filter element device, comprising: a quadrilateral filter element body, left frame body, a right frame body, an upper frame body, a lower frame body, a clamping rod;

wherein the left frame body and the right frame body are respectively disposed on a left side and a right side of the quadrilateral filter element body; the upper frame body and the lower frame body are respectively disposed on an upper side and a lower side of the quadrilateral filter element body; the clamping rod is disposed between the left frame body and the right frame body, the clamping rod comprises a transverse rod, and clamping teeth are disposed on the transverse rod; the quadrilateral filter element body is a folding layer having vertical folds, and the clamping teeth are matched with the folding layer;

wherein each of the left frame body, the right frame body, the upper frame body, and the lower frame body comprises: an elongated plate and two baffle sheets respectively disposed at two opposite sides of the elongated plate: the elongated plate and the two baffle sheets together define an elongated groove, and a width of the elongated plate in a direction from one of the two baffle sheets to the other of the two baffle sheets is less than a spacing between the two baffle sheets: a slot is defined between one of the two baffle sheets and a side of the elongated plate facing towards the one of the two baffle sheets: a corresponding one of the left frame body, the right frame body, the upper frame body, and the lower frame body is clamped on the quadrilateral filter element body through the slot; and the quadrilateral filter element body is partially accommodated in the elongated groove.

10. The spliceable and foldable filter element device as claimed in claim 9, the spliceable and foldable filter element device further comprises corner connectors: a first corner connector, a second corner connector, a third corner connector, and a fourth corner connector; the first corner connector is disposed between the upper frame body and the left frame body, the second corner connector is disposed between the left frame body and the lower frame body, the third corner connector is disposed between the upper frame body and the right frame body, and the fourth corner connector is disposed between the right frame body and the lower frame body.

11. The spliceable and foldable filter element device as claimed in claim 9, wherein each of the corner connectors comprises a transverse plate and a vertical plate; an end of the transverse plate is connected to an end of the vertical plate at a right angle, a first end plate and a second end plate are disposed on two sides of the transverse plate respectively, the first end plate and the second end plate are disposed on two sides of the vertical plate respectively, a groove is defined between the first end plate and the second end plate, and each of the corner connectors is clamped on a corner of the quadrilateral filter element body through the groove.

12. A spliceable and foldable filter element device, comprising: a quadrilateral filter element body, a left frame body, a right frame body, an upper frame body, a lower frame body, a clamping rod;
   wherein the left frame body and the right frame body are respectively disposed on a left side and a right side of the quadrilateral filter element body; the upper frame body and the lower frame body are respectively disposed on an upper side and a lower side of the quadrilateral filter element body; the clamping rod is disposed between the left frame body and the right frame body; and the clamping rod is configured to clamp the quadrilateral filter element body in an area defined by the left frame body, the right frame body, the upper frame body, and the lower frame body;
   wherein the spliceable and foldable filter element device further comprises a first corner connector, a second corner connector, a third corner connector, and a fourth corner connector; the first corner connector is disposed between the upper frame body and the left frame body, the second corner connector is disposed between the left frame body and the lower frame body, the third corner connector is disposed between the upper frame body and the right frame body, and the fourth corner connector is disposed between the right frame body and the lower frame body;
   wherein each of the first corner connector, the second corner connector, the third corner connector, and the fourth corner connector comprises a transverse plate and a vertical plate; an end of the transverse plate is connected to an end of the vertical plate, a first end plate and a second end plate are disposed on two sides of the transverse plate respectively, the first end plate and the second end plate are disposed on two sides of the vertical plate respectively, a groove is defined between the first end plate and the second end plate, and each of the first corner connector, the second corner connector, the third corner connector, and the fourth corner connector is clamped on a corner of the quadrilateral filter element body through the groove;
   each of the left frame body, the right frame body, the upper frame body, and the lower frame body is a structure having an elongated groove; and a part of one of the transverse plate and the vertical plate of each of the first corner connector, the second corner connector, the third corner connector, and the fourth corner connector and a part of the quadrilateral filter element body are together accommodated in a corresponding one elongated groove.

\* \* \* \* \*